(12) United States Patent
Dandekar et al.

(10) Patent No.: US 10,666,712 B1
(45) Date of Patent: May 26, 2020

(54) PUBLISH-SUBSCRIBE MESSAGING WITH DISTRIBUTED PROCESSING

(71) Applicant: Amazon Technologies, Inc., Seattle, WA (US)

(72) Inventors: Chetan Manohar Dandekar, Bellevue, WA (US); Saral Jain, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 15/179,886

(22) Filed: Jun. 10, 2016

(51) Int. Cl.
*G06F 15/16* (2006.01)
*H04L 29/08* (2006.01)

(52) U.S. Cl.
CPC ............. *H04L 67/10* (2013.01); *H04L 67/02* (2013.01); *H04L 67/12* (2013.01)

(58) Field of Classification Search
CPC ..... H04L 67/02; H04L 67/28; H04L 67/2819; H04L 67/14; H04L 67/2842; H04L 67/322; H04L 67/327; H04L 67/26; H04L 12/1859; H04L 12/1895; H04L 12/4604; H04L 47/11; H04L 47/70; H04L 47/801; H04L 47/806; H04L 47/822; H04L 47/829
USPC .......................... 709/206, 222, 217, 228, 245
See application file for complete search history.

(56) References Cited

U.S. PATENT DOCUMENTS

| | | | |
|---|---|---|---|
| 2004/0181588 A1* | 9/2004 | Wang ...................... | H04L 29/06 709/207 |
| 2005/0267896 A1* | 12/2005 | Goodman ............. | G06Q 10/107 |
| 2006/0149840 A1* | 7/2006 | Thompson .............. | H04L 45/24 709/224 |
| 2006/0168331 A1* | 7/2006 | Thompson .............. | G06F 9/542 709/238 |
| 2008/0033845 A1* | 2/2008 | McBride .............. | G06Q 10/087 705/28 |
| 2008/0082562 A1* | 4/2008 | Rooney ................... | H04L 67/26 |
| 2008/0209440 A1* | 8/2008 | Ginis ...................... | G06F 9/542 719/315 |
| 2011/0225229 A1* | 9/2011 | Srivastava ............. | G06Q 10/00 709/203 |
| 2013/0067492 A1* | 3/2013 | Fidler ..................... | G06F 9/542 719/318 |

* cited by examiner

*Primary Examiner* — Farzana B Huq
(74) *Attorney, Agent, or Firm* — Thorpe North & Western, LLP.

(57) ABSTRACT

Technology for a publish-subscribe messaging method may include determining a schema for structuring raw data published in a publication by a publisher in a publish-subscribe system at a channel node in a network and distributing the schema from the channel node to other channel nodes in the network. The method may include identifying the publication from the publisher at one of the channel nodes and applying the schema to the raw data of the publication at the channel node, transforming the raw data to transformed data. The transformed data may be provided at a subscriber in the publish-subscribe system.

20 Claims, 8 Drawing Sheets

PUBLISH-SUBSCRIBE MESSAGING WITH DISTRIBUTED PROCESSING

BACKGROUND

The Internet of Things (IoT) is the network of physical objects—devices, vehicles, buildings and other items—embedded with electronics, software, sensors, and/or network connectivity that enables these objects to collect and exchange data. The IoT allows devices to collect information from sensors and to be controlled remotely across existing network infrastructure, creating opportunities for more direct integration of the physical world into computer-based systems, and resulting in improved efficiency, accuracy and economic benefit. The promise of the IoT is to make everyday products smarter for consumers, and for businesses to enable better, data-driven offerings that were not possible before.

IoT devices may use publish-subscribe technologies to exchange data. In computer-related technologies, a publish-subscribe system is typically a messaging model or messaging configuration where senders of messages, called publishers, send messages or publications to topics or message queues to be consumed by receivers, called subscribers. A publish-subscribe system may be a system where messages are published by publishers into classes or topics without knowledge of which subscribers, if any, there may be to receive the message(s). Subscribers may receive messages through an intermediate broker that performs subscription matching based on a subscription to a topic from the subscriber. Subscriptions may specify topics of interest, sources of messages of interest, types of messages, or content of interest, etc. A "topic" may be a character string that describes the nature of the data that is published in a publish/subscribe system. The broker matches the topic with a list of subscribers who have subscribed to that topic and delivers the message to each of those subscribers.

With the accelerating adoption of networked service provider environments (e.g., "cloud" computing) around the world, organizations are increasingly seeking ways to manage large amounts of data which may be produced by IoT devices and may be published as messages to subscriber devices.

DETAILED DESCRIPTION

Figure 1A:
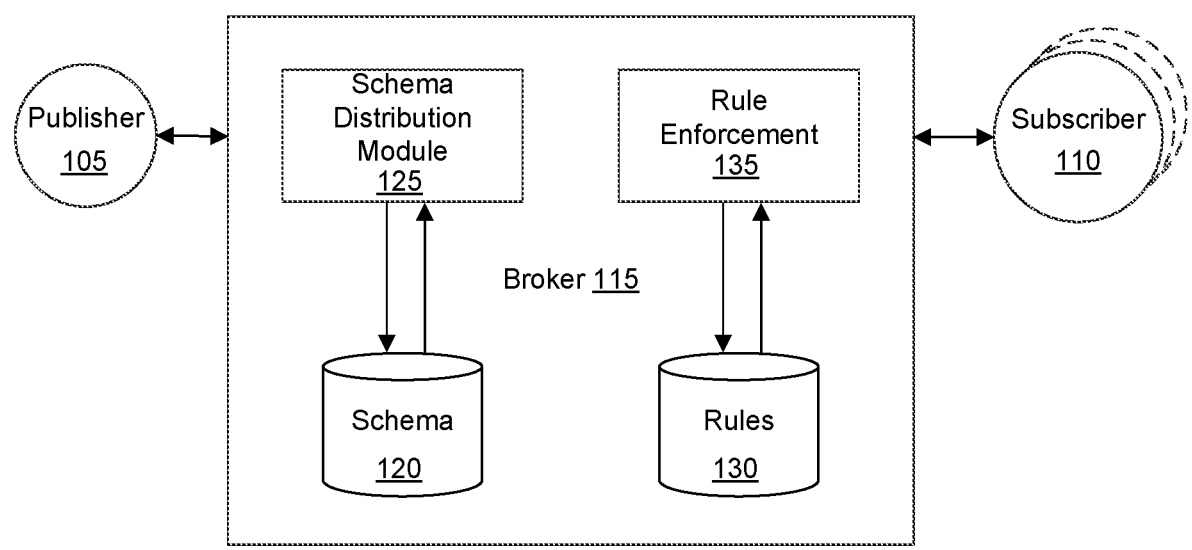
FIGS. 1A-1B are schematic overviews of systems for publish-subscribe messaging in accordance with an example of the present technology.

A technology for a publish-subscribe messaging method may include determining a schema for structuring raw data published in a publication or published message by a publisher device in a publish-subscribe system at a channel node in a network (i.e., a publish-subscribe channel) and distributing the schema from the channel node (e.g., a node or device in the publish-subscribe channel or communication stream) to other channel nodes in the network. At least some of the channel nodes may be publisher devices or subscriber devices. The method may include identifying the publication from the publisher device at one of the channel nodes and applying the schema to the raw data of the publication (e.g., published message(s)) at the channel node, transforming the raw data to transformed data. The transformed data may be provided to a subscriber via the publish-subscribe system.

In another example, a method for distributed processing of raw data in a publish-subscribe system may include determining a schema for structuring the raw data in a publication published by a publisher device at a channel node of the publish-subscribe system in a network by using publisher data included in the publication. For example, the publisher data may include information about the publisher, such as a type of the publisher device, a manufacturer of the publisher device, a model number of the publisher device, a network address of the physical device, a port number used by the publisher device to publish the publication, etc. The schema may be distributed the from the channel node to other nodes in the network. The publication may be received at a channel nodes as received from the publisher and the raw data in the publication may be transformed to comply with the schema, resulting in transformed data.

The transformation of the raw data in the publication to comply with the schema may occur at any channel node in the network, such as at the publisher device, at a subscriber device, at a gateway device, at a broker server, etc. A rule may be identified to execute on the transformed data based on the schema that has been identified. Similar to the schema, the rules may be distributed across channel nodes on the network, including storing rules at the channel node and the other nodes. Distribution of the rules allows for execution of the rules at a selected channel node to optimize performance, throughput, latency, or the like. The rules may include any of a variety of different types of rules and may be defined or selected by an administrator. The technology may determine whether to execute the rule at the channel node or other nodes based on device or network conditions. Some example network conditions that have been described include battery power, network bandwidth, network latency, privacy, processor availability, memory availability, etc. Then the technology may send the rule to the channel node or other node(s) that have been selected and execute the rule to process the transformed data at the channel node or other nodes that have been selected, resulting in processed data. The processed data may then be provided to a subscriber in the publish-subscribe system.

The present technology may be provided using a service provider environment which supplies virtualized computing services (e.g., virtualized computing, virtual data storage, virtualized networking, etc.). For example, the service provider environment may provide one or more services to host data published by publishers and/or any other data desired to be hosted. The service provider environment may enable customers or subscribers to initiate services on demand to perform any of a variety of functions on data in messages published by a publisher. When a service is initiated on demand, underlying resources associated with the service may be initiated, such as to accommodate processing, storage, networking or other demands for the service. The service provider environment may provide a marketplace to enable the purchasing of sharing and hosting of data for subscribers, publishers, etc. The service provider environment may provide a marketplace to enable subscribers and publishers to purchase compute time to enable the execution of functions on the data. The service provider environment may provide a marketplace to enable to purchase of rules and/or functions.

FIG. 1A illustrates an example system for transforming message data in a publication-subscription type of system. The system includes a publisher 105, a broker 115, and one or more subscribers 110. The publisher 105 may publish messages or publications to the broker 115 and the broker 115 may transmit the messages to one or more subscribers 110, such as those who have subscribed to the messages from the publisher 105 or a topic identified in the message published by the publisher 105. In some examples, a topic may identify a subject or group of subjects or may identify a publisher 105 or group of publishers. Further, a topic may be a specific type of data stream that is not necessarily human readable but is readable by machines which consume published information.

The present technology may be utilized in a topic-based system, where messages are published to "topics" or named logical channels or message queues. Subscribers 110 in a topic-based system may receive messages published to the topics to which the subscribers 110 are subscribed, and each subscriber to a topic will receive the same messages. The publisher 105 may be responsible for defining the classes of messages or topics to which subscribers 110 may subscribe. The present technology may be utilized in a content-based system where messages are delivered to a subscriber 110 if the attributes or content of those messages matches or is associated with constraints defined by the subscriber 110. The subscriber 110 may be responsible for classifying the messages. The present technology may be utilized in a hybrid system where publishers post messages to a topic while subscribers 110 register content-based subscriptions to one or more topics.

The publisher 105 may be a device having a transducer, sensor, or other data generating device for capturing, generating or creating the message data. The message data may, in various examples, be generated periodically and trigger the sending or publication of messages in response to generated data. The triggering of the messages may occur upon request from the publisher, upon request from the broker 115, continuously in a stream, at random intervals, at defined intervals, upon occurrence of defined events, etc. The message data may include one or more data types such as images at a publisher location, a geolocation of a moving publisher, environmental temperature at the publisher, internal temperature of the publisher 105, state of a publisher 105, or the like. The type of data to be updated in the message may be any of a wide variety of other types of data or combinations of data.

The present technology enables customers to structure data from devices such as Internet of Things (IoT) devices which may act as the publisher 105 in a publish-subscribe system. Applying a structure to the data may enable communication between devices and/or use of data generated by one device at another device or by a user or software application. At least some devices generate raw data in an unstructured format. The present technology may structure the data and may use a schema 120 to define the structure of the data. While some data may be unstructured, the phrase "raw data" as used herein may refer to structured or unstructured data which may be generated and/or published by a publisher 105 device. While some data may be structured, the structure may be incompatible or inconsistent with data from other devices and may thus be transformed using the schema to a structure usable across a publish-subscribe channel.

The present technology may identify or determine a schema 120 to apply to the data from a publisher 105. In one example, a customer may define the schema 120. In another example, an existing schema may be detected and either maintained or modified. In a further example, a schema 120 may be created to fit data published by the publisher 105. The schema may be a JSON (JavaScript Object Notation) schema. A schema 120 may enable validation, documentation, and interaction control of data conforming to the schema. Using a farm tractor as an example publisher 105, the farm tractor may publish a number of data points and the schema may enumerate the different parts of the tractor from which data is expected and/or the type of data that is expected. For example, a schema 120 may be structured as follows:

```
{
    "$schema": "http://json-schema.org/schema#",
    "title": "Tractor",
    "type": "object",
    "required": ["id", "make", "model"],
    "properties": {
        "id": {
            "type": "number",
            "description": "Tractor identifier"
        },
        "make": {
            "type": "string",
            "description": "Manufacturer of the tractor"
        },
        "model": {
            "type": "string",
            "description": "Model number of the tractor"
        },
        "tags": {
            "type": "array",
        }
    },
    "environment": {
        "type": "object",
        "properties": {
            "engine temperature": {
                "type": "number"
            },
            "GPS coordinate": {
                "type": "number"
            },
            "engine RPM": {
                "type": "number"
            },
            "clock_time": {
                "type": "number"
            }
        }
    }
}
```

Upon determination of a schema 120 for raw data, the schema 120 may be distributed by a schema distribution module 125 across a publish-subscribe channel, such as to publisher 105 and/or subscriber(s) 110. Channel nodes (e.g., publisher or subscriber devices, gateways, broker services, etc.) may receive the schema 120 in order to interpret and/or enforce the schema 120. The schema 120 may be stored by a broker 115 or other network service. The publisher 105 of the raw data may receive the schema 120 and may optionally enforce the schema 120 on the raw data being published to transform the raw data to transformed, schema-compliant data prior to publication (or subsequent publication where the schema is determined after at least an initial publication). The present technology may provide a unified platform for using the determined schema. The schema 120 may be enforced through the publish-subscribe channel, from the source publisher devices to a networked device (e.g., gateway, database, etc.) to an application at a subscriber device, etc.

In existing database technology, a customer may define a schema 120 and then add data to the database. According to the present technology, a customer or a customer device may begin generating data by publishing the data, storing the data in a data store or the like, and the present technology may build or detect a schema from a publish-subscribe topic structure, message structure, etc. to reduce the work by the customer in setting up and managing a publish-subscribe network. In determining the schema 120, the broker 115 may analyze a publish-subscribe topic, message content, names of fields in the message, device (i.e., publisher) data from which the data originates (model number or the like), etc. The detected/generated schema may be presented to the customer for review, approval and/or modification. The customer may optionally elect to further define the schema 120 based on the computer-generated schema.

When a message is published, the present technology enables the data in the message to be deciphered by using the common schema for devices across the network. Using the farm tractor example, different tractors may publish data using different schemas. One or more of the channel nodes in the network may transform the published data to transformed data sharing a common schema. A common schema may be a schema used to represent data or publications from multiple sources or publishers in one schema. As another more specific example, a customer may wish to use an app on a mobile device to control a number of smart locks. The smart locks may have different manufacturers, model numbers, etc. and may publish or interpret data using different schemas. One or more network nodes (e.g., a smart lock, the mobile device, a gateway, a central server such as the broker 115, etc.) may identify a common schema that is usable to control each of the smart locks. A same unlock command from the mobile device may be able to unlock any of the networked smart locks. The app on the mobile device may be able to accurately display a lock status of the smart locks. If a particular smart lock is unable to process the schema when receiving a command from the mobile device, the command may be converted from the common schema to the lock-specific schema after issuance of the command at one of the nodes in the channel between the mobile device and the lock. This conversion may be the result of a predefined rule for that lock. Thus, in this example, the lock may use a first schema specific to the lock and the app may use a generic schema intended to be applicable to each of the locks, and in some cases data in one schema may be modified by business logic to allow communication in the other schema.

Use of a schema 120 that is understood across the network may assist in applying customer-defined business logic based on the schema 120 or the data represented using the schema. The schema 120 may be pushed to the channel nodes (e.g., publisher 105, subscriber 110, hub, gateway, endpoint of a service provider environment or computing service) in the network using the schema distribution module 125. If a device is capable of executing some code, a rules engine for rule enforcement 135 may be created that will work on that device to enable the device to execute the business logic or rules 130 on the data. The rules engine may be created at one of the channel nodes (e.g., the broker 115) and pushed to the device to enable the device to execute the rules 130. The rules engine may be pushed or distributed together with the rules 130 or separately from the rules 130. The rules 130 may be executed across multiple channel nodes. For example, a particular device may be capable of aggregating integers but not strings. Where aggregation of integers and strings is desired, the device may aggregate the integers and then the strings may be aggregated at a gateway, at the broker or some other networked location. The rules 130 may be distributed and orchestrated across devices, gateways, servers, etc. When deciding where to enforce the schema 120 and/or the rules 130, the determination may depend on battery power, network connectivity, etc. of one or more of the channel nodes. A customer may optionally define where to transform the data or execute the rules, but in many examples one or more of the channel nodes may dynamically determine where to transform the data or execute the rules for optimal or improved efficiency, latency, resource usage, etc.

The rules 130 may also include validation rules. When data is published, the data may include one or more data points or a series of data points. Using the farm tractor example above, a customer may have data indicating that with a particular tractor having a specified engine what the RPMs (rotations per minute) of the engine were at a given time, what the temperature of the engine was at this time, etc. Historical data may be analyzed, viewed, manipulated, graphed, etc. The historical data store may be created, including the historical data, rules, schema, etc. when a customer connects a device (channel node) to the network. Using historical data, new data may be validated using validation rules. If the tractor engine is producing incorrect data, a notification may be automatically generated and sent to the customer that there is invalid data coming in to enable the customer to take remedial action to address the issue. For example, if a typical publication from the tractor includes four attributes or properties of the tractor, as may be determined from historical information or even from the schema, and then publications start including fewer or greater than four attributes, the customer may be notified that something is wrong. In some examples, the customer may define rules for what to do if data is missing or if extraneous data is included. Depending on the configuration of the rules or the customer preferences, these rules may be implemented upon detection of the invalid data. Historical data may be stored for a desired period of time and used for validation, analysis or other purposes. The data lifecycle may also be automated by enabling the customer to define rules to delete data older than a predetermined period of time measured back from the present or to put the older data in a slower data store or the like.

Figure 1B:
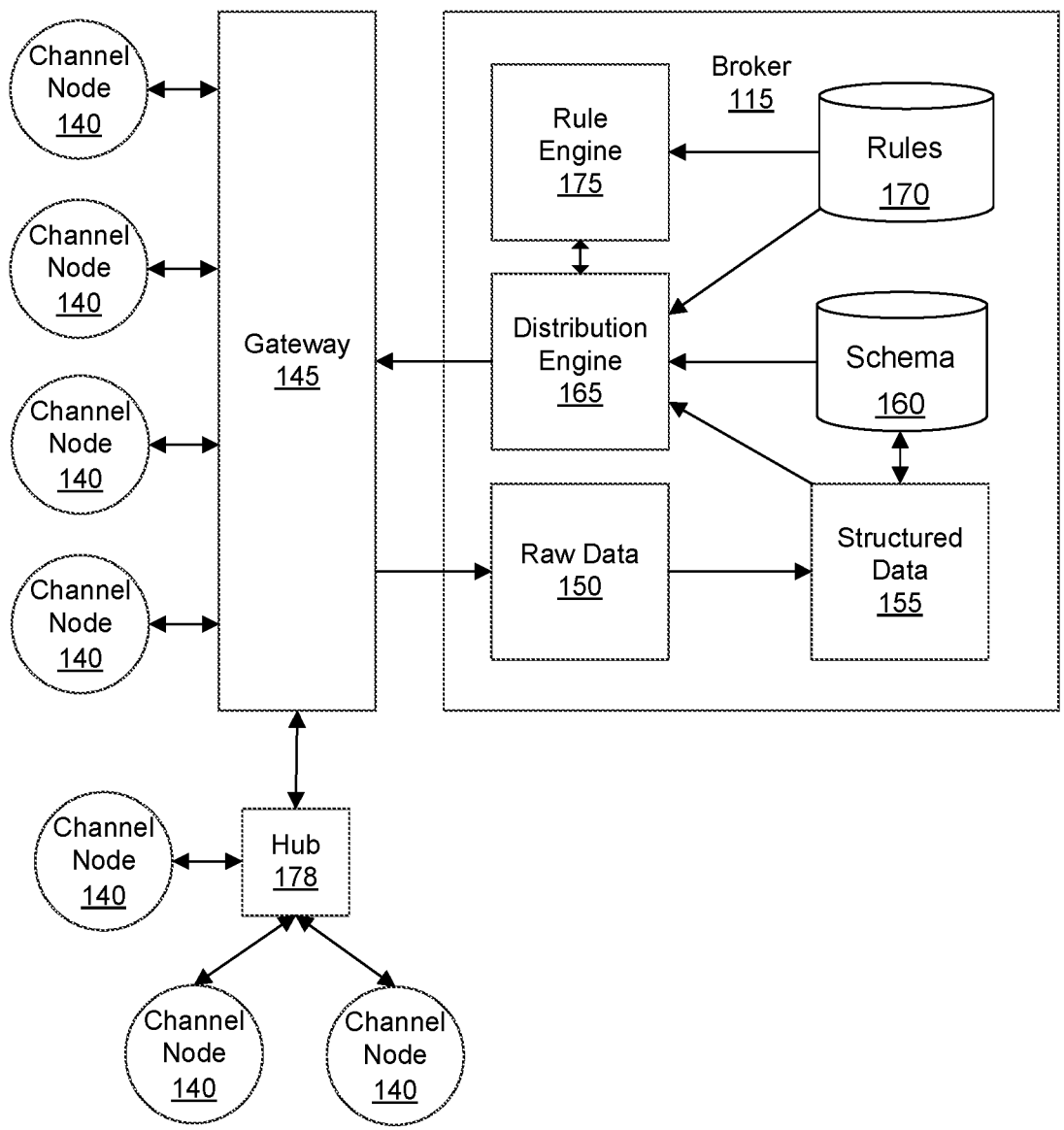

FIG. 1B illustrates a system for managing messages in a publish-subscribe system in accordance with an example of the present technology. Some features of the system may be similar to those described previously with respect to FIG. 1A. FIG. 1B illustrates a system including a plurality of channel nodes 140. In FIG. 1B, these channel nodes 140 may represent publishers of data and/or subscribers to data. The system also includes a gateway 145 and a broker 115 which, although labeled differently for differentiation in describing the features of FIG. 1B, the gateway 145, hub 178 and broker 115 may also be nodes in the publication channel and thus may also be channel nodes. In one example, at least one of the channel nodes 140 may be a computing device used for monitoring or controlling other of the channel nodes 140. Using the smart lock example described previously, one of the channel nodes 140 may be a mobile device and the other channel nodes 140 may be the smart locks.

The gateway may be a router or similar networking gateway and may forward packets between networks, between channel nodes, etc. A channel node 140 acting as a publisher may publish the publication via the gateway 145. The publication may include raw data 150. The raw data may be unstructured or have a structure which is not shared or understood by other channel nodes 140. The raw data 150 may be transformed to structured data 155 by determining and enforcing a schema 160 on the raw data 150. A distribution engine 165 may distribute the schema 160 across the channel to the various channel nodes 140 as well as the gateway 145 to enable these devices to learn and/or enforce the schema 160. The distribution engine 165 may also distribute the structured data 155 to one or more subscribers of the data (e.g., channel nodes 140). When the structured data 155 matches one or more rules 170, a rule engine 175 may execute the rule on the structured data 155 prior to delivery to subscribers, such as to manipulate or transform the data into something usable by the subscribers. The distribution engine 165 may also distribute the rules 170 across the channel, similarly as with the schema 160, to enable execution of the rules 170 at any of the channel nodes 140, gateway 145 or broker 115.

Devices (i.e., channel nodes 140) may exist that produce data with varying types of structure. If the data is unstructured, extracting value from the data may be more difficult. The system of FIG. 1B may auto-detect the data type from incoming unstructured data. For example, if JSON message data is received, the message data may be analyzed to figure out what the structure is and what possible instructions or values exist for the data (e.g., on/off or low/medium/high, etc.). A schema 160 may be determined and enforced for future data received from the same device. This allows the data to be structured for analytics.

The system may identify data by looking at patterns, such as, for example, by looking at the last N number of data points. Also, the system may analyze how the customer is consuming the data to change a data or device state to determine what the data is and how that data is returned to the channel node 140. Additionally, the system may analyze the messages being sent by the customer. By identifying which fields change, the system may narrow down the data type, device type, device states or the like.

In one example, customers may create their own communication structure in a publish-subscribe environment. This communication structure may follow a topic structure. For example, a mobile computing device such as a smart phone may include an app for controlling smart lighting. The app may write or publish to a topic of "/my/home/room1/light1". The customer may have a JSON document associated with the topic to provide information about the light bulb or washing machine to be controlled to the system. The present system may detect a lot of patterns from the topic structure and the JSON document to create the schema for the customer (e.g., temperature, switching, volume, etc.). The system may prompt the customer to review and accept, reject or modify the schema that is determined. If the customer accepts the schema, the schema may be enforced in future publications or data communications from the device. Use of the schema may ensure that the data is in the correct or desired format, may ensure that multiple disparate devices use a same schema, may enable cleaning up the data (e.g., when additional data is included that is not useful), and may facilitate providing data conversions.

The present technology may enable a sort of "feedback loop" for IoT devices. For example, the system may notify the customer that changes are going to be made to the customer's light that has been detected. Based on analytic conclusions, a rule may be executed to set data or set a device state or the like. For example, if the sky becomes overcast as detected by a light sensor, a state of the light may be switched from 'off' to 'on'. In the case of a sprinkler, published weather forecast data may indicate that rain is coming and the system may switch the sprinkler to 'off'. For a heart rate monitor, an alert may be sent out when the heart rate is below a certain level (e.g., heart rate of 72 beats per minute drops to 35 beats per minute). Automatic actions may be taken that are inferred based on the detected data format. In other words, while some rules may be customer defined and implemented as has been mentioned previously, some actions or rules may be inferred and enforced or executed, optionally with a notification to the customer to approve or reject the current action or to approve or reject future automatic actions for the inferred rule.

The present technology may provide a data marketplace and an interface for customers to plug-in new datasets, as well as define user-defined functions or rules. The technology may provide extensible pay-per-use functionality of the rule sets that contain IoT rules. For example, a customer, a product manufacturer or the like may pay a fee each time a rule is executed, or based on a size of message, or based on an additional data source accessed to perform execute the rule, etc.

The present technology may utilize a client/server or virtualized network architecture that involves client computers connecting through a server with other client computers. Such a configuration may facilitate message brokering, subscription to topics, transformation of published messages with secondary data and so forth. An example of the client/server architecture or virtualized network of the present technology provides a central data center having at least one server provided therein.

Figure 2:
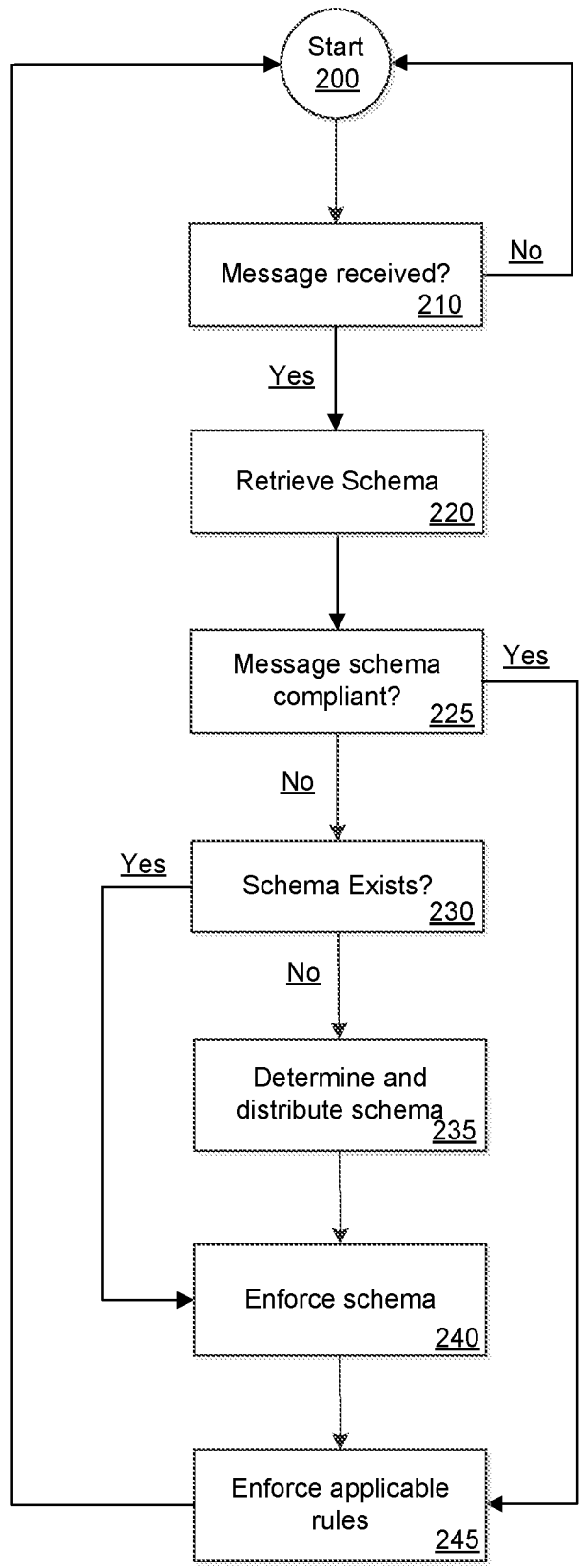
FIG. 2 is a flow chart illustrating a process for publish-subscribe messaging in accordance with an example of the present technology.

Referring now to FIG. 2, a process in a publish-subscribe system according to the present technology is illustrated as a simple decision tree or flow diagram. After a start 200 of the process, receipt of a message from a publisher may be detected 210. If no message has been received ('no' at 210), then the process may return to the start 200 and wait for a message to be received. If a message has been received ('yes' at 210), then a schema may be retrieved from a data store at 220, such as when the user has pre-defined the schema for the incoming payload (i.e., the message). A determination may be made at 225 as to whether the message is schema compliant. If a schema exists and the message follows the schema, then the message is schema compliant and the process may proceed to enforce any applicable rules at 245. If the message is not schema compliant but a schema exists at 230, then the schema may be enforced at 240 before enforcing applicable rules 245. If a schema does not exist at 230, the process may proceed to determine and distribute the schema at 235 before enforcing the schema at 240. After a message is sent to the destination or after applicable rules have been executed, the process may start 200 again at waiting for a message.

The destination to which the message is sent may be a subscriber, an interested party, or may be a different destination. For example, the message may be stored in a data store for persistence and may be accessible by interested parties. In another example, the destination may be the publisher. In another example, the destination may be the broker. Specifically, the message may be published from the broker back to the broker to determine whether additional transformations or rule executions are to be performed, etc., similar to when an initial or original publication of a message is received. The broker has the ability to funnel transformed data to different endpoints (i.e., different subscribers). Any number of subscribers may subscribe to any number of topics or publishers. Publishers may be represented by disparate devices providing data and the published data may be sent to other types of devices, services, or the like. In one example, functions executed according to defined rules may query information, correlate data, combine data, etc. substantially in real time to add value to the data from the publishers.

The present technology simplifies collecting, processing, and accessing device-generated data, so that developers and data scientists at companies of all sizes may focus on analyzing and acting on the device-generated data in near real-time, rather than spending time building and managing the data infrastructure. When devices connect to the systems of the present technology, directly, intermittently, or via a gateway, and start sending data, the system automatically organizes the series of device data points, enabling analytical and monitoring applications to easily access the data. The system may run data validation and aggregation rules on-board the devices, on gateways, and/or at networked services, servers or devices so that applications have access to usable data in near real-time, while optimizing the use of resources such as network bandwidth. The technology enables applications to query or subscribe to any device-generated data, recently generated or archived, via a common set of APIs (Application Programming Interfaces). By enabling rules to be executed on the message data, the system may automate a lifecycle of the device-generated data to help companies fulfill privacy and compliance requirements.

IoT applications may span applications from energy metering and oil and gas production to fleet management and smart homes. However, gathering and using data from large fleets of sensors embedded in everything from manufacturing equipment and vehicle fleets to fitness devices and homes involves a significant amount of development and infrastructure effort. The present technology assists in managing this complexity, providing a pay-as-you-go service that handles the technical issues involved in getting usable data from billions of disparate devices and analyzing and acting on the data in near real-time.

With the present technology, customers may ingest and organize device-generated data. When devices from solar panels and scientific equipment to cars and coffee machines send data to the present system, the system automatically stores the data points in series of data points, enabling customers to access trends in the data as well as specific data points. Data streams may be automatically provisioned for each connected device so that solution developers and data scientists may focus on interpreting the data rather than managing the data infrastructure. The present technology may automatically detect schemas used by the devices, providing customers a head start on precisely interpreting the data. Customers may customize the detected schemas or predefine schemas even before any data is ingested. The present technology may supports several data formats while also supporting customers to bring their own code to interpret any other data formats. While the present technology may organize device-generated data, customers may retain direct access to the raw data for purposes such as audit using full-text search.

With the present technology, customers may automate and optimize data processing across devices, gateways, and other network devices or services. The present system may process and make raw device-generated data usable in near real-time. The system lets customers specify rules and have them automatically execute whenever devices send new data. The system may distribute rule executions across devices, gateways, and other networked resources or services so as to optimize the use of resources such as battery power and network bandwidth, while achieving data processing goals such as low latency and privacy. Rules may be configured to validate raw data and alert operators if a device is generating erroneous data. Rules may also be configured for aggregating numerous raw data points into fewer data points, thus separating "signal"—new or useful information—from "noise". Rules may also be configured to transform data using relevant business logic, for example mapping temperature and humidity readings from sensors in a forest to forest fire danger ratings of low', 'Moderate', 'High', or 'Extreme'.

With the present technology, customers may enable applications to easily access the data for monitoring, analysis or machine learning. The present technology enables applications to access device-generated data through secure REST (Representational State Transfer) APIs and database connectors. Applications may also subscribe to desired data and receive the publications when pushed by the broker. Applications benefit from a common way to access recent or historical data. For example, a power plant monitoring application may use a same interface to access recent data for charting fuel efficiency in near real-time as to access historical data for charting and comparing fuel efficiency trends.

With the present technology, customers may easily manage the lifecycle of the data. The system enables customers to automate the lifecycle of their device-generated data to reduce complexity, risk, and cost of storing the data. Customers may specify a "time-to-live" when the data is produced or published, or have a rolling schedule to archive or erase the data stored in one or more data stores. Customers may specify aggregation schedules. For example, a power company may automate the present system to retain every raw data point for the trailing 3 months, data points at one hour intervals for 30 months, weekly data for 60 months, and erase data older than 60 months.

With the present technology, customers may securely share the data. The system provides customers fine-grained control over which users have access to what device-generated data. Customers may share data within organizations as well as with partners. For example, a weather company may share data collected from weather stations to an agriculture company forecasting crop yield. Customers may monitor and meter data consumption.

The present technology may provide structuring of data at the source, in-motion, and at-rest using schemas. The technology serves as a unified place for customers to specify and apply desired data models to devices, from data in transit between the devices and networked resources to data at-rest in a data repository. For example, when a customer defines a schema or data model for a connected car engine, the technology may ensure that connected car engines comply with the schema when emitting the data, and may further ensure that the data continues to comply with the schema when the data reaches networked resources (e.g., hubs, gateways, etc.), when the data is processed and when the data is stored for longer term use.

The present technology may provide automated and optimized data processing across devices, hubs, gateways, and networked resources or services. In some scenarios and operating conditions customers may wish to process data on-board devices or at gateways before sending the data to networked resources, such as in a service provider environment. For example, a farm tractor may collect data at a far higher rate than what is currently useful to a corporation, while the network bandwidth connecting the tractor to the service provider environment is a constrained resource. As a result, the customer may reduce the data on devices, hubs, or gateways before sending the to the service provider environment for further processing and use. Because schemas, rules, and the like are shared across on-board devices, hubs, and gateways on through to the service provider environment for automating data aggregation and transformation, customers may specify data processing at one place and have the present system deploy and execute such rules.

Customers may define the desired structure for their device-generated data using schemas and may have the option of predefining schemas. For example, a car manufacture may define a schema for a car engine, a coffee machine manufacturer may define a schema for an espresso machine, etc. Customers have the option to assign schemas to devices when the devices are added to the present system. When device-generated data is received in the cloud, the system validates that the data is complying with the desired schema. Customers do not need to define schemas from scratch. Customers may have the present technology derive a schema by sampling the raw data sent from a device at any time. By default, a schema may be derived when a device is on-boarded to the system registry but does not have any pre-assigned schema. Multiple schemas may be applied to a single device. For example, a connected car could be emitting engine diagnostics, weather data, and traffic data. In this case, the car may have three schemas assigned, including one for each type of data. In some examples, multiple schemas may be applied to a single device when the data is intended for different purposes, where a particular schema is applied based on the intended purpose. In yet another example, different devices may be assigned different schemas.

Figure 3:
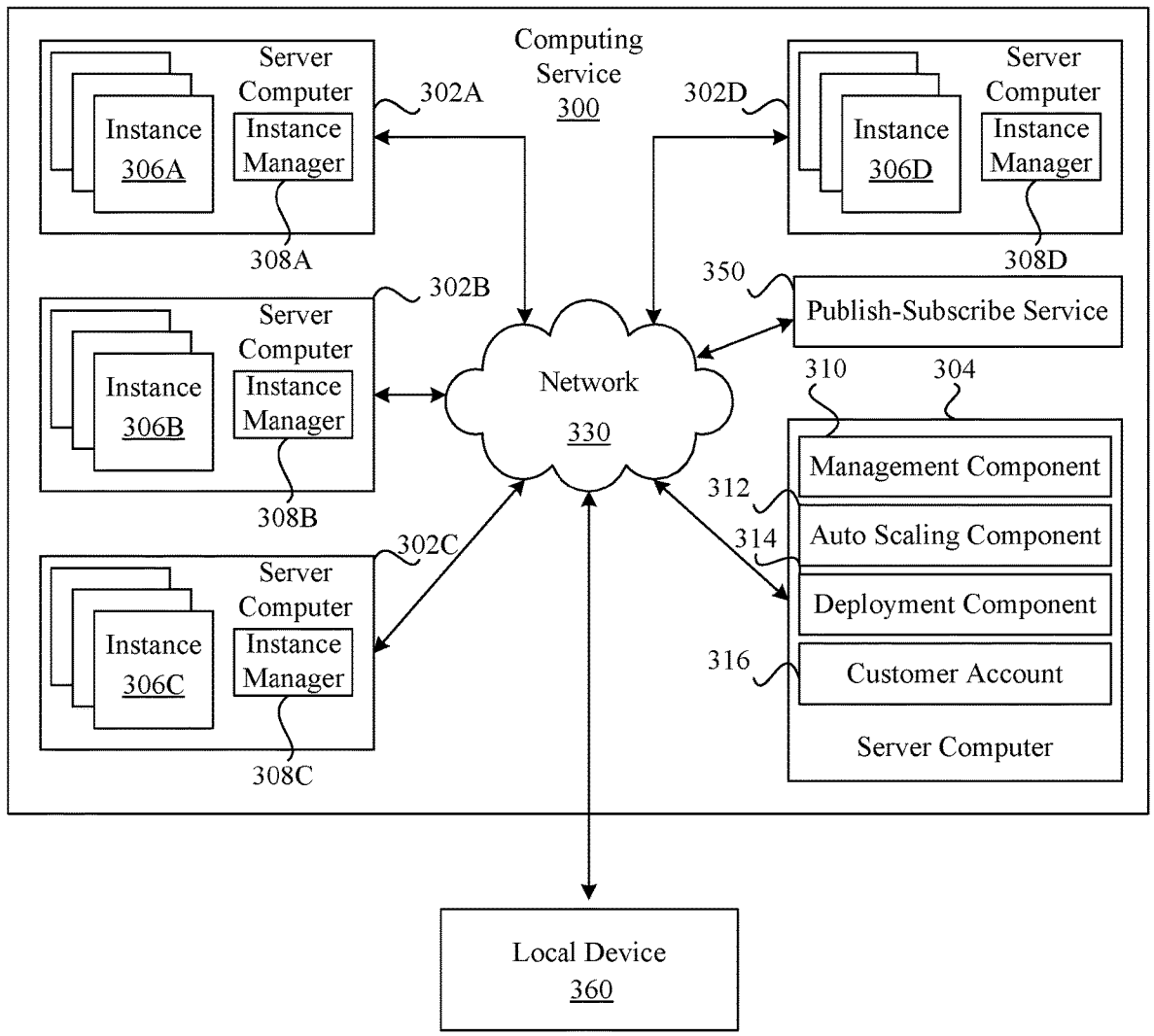
FIG. 3 is a schematic overview of a virtual computing resource service in accordance with an example of the present technology.

The publish-subscribe message technology using the methods or aspects described may be executed or maintained in a data center or service provider environment for a computing service provider. FIG. 3 illustrates how components of a data center may function as a computing service 300 in a service provider environment to provide a platform for computing instances which the present technology may use to execute nodes as described. The computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc. running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing software instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of subcomponents executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

The computing service 300 may be used to host or provide any number of potential services to customers, such as storage, compute, or other services. In one example, a publish-subscribe service 350 may be provided for managing subscriptions, message receipt, message transformation for schema enforcement, message transmission, schema and rule distribution, and the like between the server computers 302A-302D, or between devices (e.g., multiple of local device 360) external to the computing service 300 or between a server computer 302A-302D and a device (e.g., local device 360) external to the computing service 300 as has been described. In one example, the publish-subscribe service may be hosted on one or more of the server computers 302A-302D rather than being separate from these server computers 302A-302D as illustrated.

A network 330 may be utilized to interconnect the server computers 302A-302D and the server computer 304. The network 330 may be a local area network (LAN) and may be connected to a Wide Area Network (WAN) 340 so that end users may access the computing service 300. It should be appreciated that the network topology illustrated in FIG. 3 has been simplified and that many more networks and networking devices may be utilized to interconnect the various computing systems disclosed herein.

Figure 4:
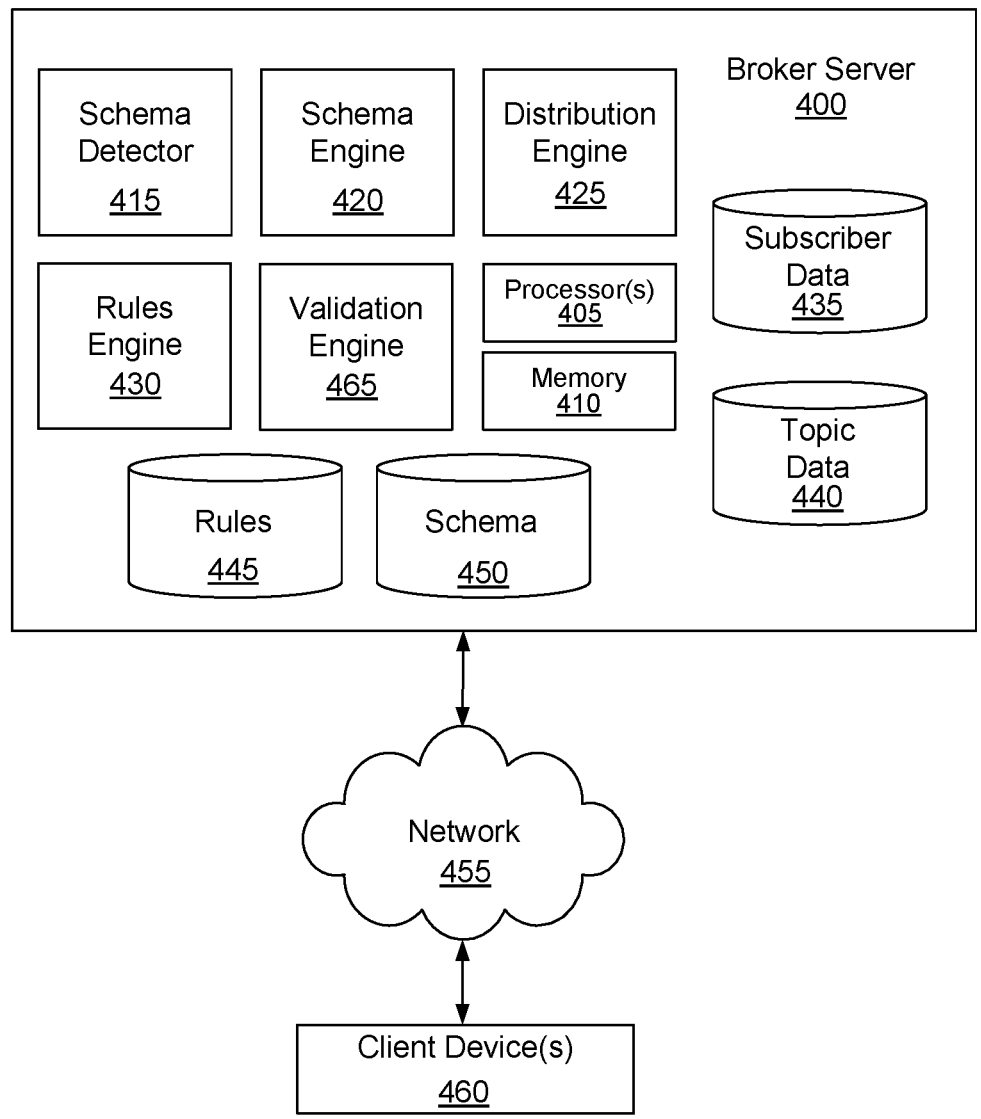
FIG. 4 is a block diagram of a system for managing publish-subscribe messages, publications and subscriptions in accordance with an example of the present technology.

Referring now to FIG. 4, a block diagram of a system in a service provider environment for managing publish-subscribe messaging is illustrated in accordance with an example of the present technology. The system elements may be implemented using one or more computing devices in a service provider environment, such as a broker server 400 or broker service as an example computing device, as well as client devices 460 which may be external to the service provider environment, and may be implemented across a network 455.

The system may include one or more data stores 435-450 and a number of modules or services 415-430, 465 as part of a publish-subscribe messaging service. Client device 460 may represent a plurality of client devices comprising at least some of the channel nodes or the publisher(s) and subscriber(s), where messages are transmitted over the network 455.

Computing services offered by a service provider environment, may include a computing device (e.g., a droplet) that executes one or more servers or computing instances on the computing device. One or more servers (e.g. a computing instance operating as a server) may be operated to execute an operating system and implement a communications application which is scalable and asynchronous. A user may create, launch, and terminate servers as desired. The user may have some control over the geographical location of servers or clusters of servers to optimize latency and provide high levels of redundancy.

The broker server(s) 400 may be a virtual computing instance as previously explained, and the virtual computing instance may be implemented using a virtualization computing environment in a service provider environment, which may include a virtual distributed computing system with a virtualization layer executing on a hardware substrate layer. The hardware layer may include a plurality of physical computers, servers or processing nodes. The virtualization layer (e.g., hypervisors and virtualization control plane) may provide platforms on which virtual computing instances may be created. In other words, the virtual computing instances may execute on the hardware layer by using the platform provided by the virtualization layer. This computing service architecture that supports computing instances is illustrated in more detail in FIG. 3.

The broker server 400 may be configured to receive messages from a publisher. The publisher may be an internet of things (IoT) device having a transducer for detecting a condition and expressing the condition as raw data. Upon receipt of a message, the broker server 400 may queue the message for delivery to a subscriber. The broker server 400 may maintain a data store of subscriber data 435 identifying subscribers and a data store of topic data 440 identifying topics to which a subscriber may subscribe or to which a publisher has published or may publish one or more messages. The broker server 400 may identify a topic in a message, either explicitly identified in the message, implicitly determinable based on the message data, or based on the publisher. If the topic in the message corresponds to a topic in the topic data store 440 then subscribers having subscribed to the topic may be queued to receive the message. In one example, the subscriber data store 435 and the topic data store 440 may comprise a single data store managing the relationships of subscribers and topics. The broker server 400 may store or manage publisher data and/or authentication data for authenticating publishers or subscribers as well. In this example, the subscriber data store 435 may operate as a subscription data store to manager aspects of the subscription in addition to those pertaining specifically to subscribers.

The message from a publisher may include a tuple, data fields, a raw blob of data, or another data arrangement defining message data, a publisher identifier, or any other suitable information or information fields. The schema detector 415 may determine whether the message complies with a schema or whether the schema for the message exists. The schema 450 may be for structuring raw data in a publication published by a publisher in the publish-subscribe system. The schema detector 415 may use publisher data or message data included in the publication, including topic data, to identify or determine the schema 450, at least in part. The schema engine 420 may apply the schema to the raw data to transform the raw data to transformed data. The schema engine 420 may also ensure that the schema 450 is propagated across the network to channel nodes (e.g., client device(s) 460) via the distribution engine 425.

The system may include a rules engine 430 for executing rules 445 on the transformed data for processing the data into processed data. The rules engine 430 may also be configured to determine at which of the plurality of channel nodes to execute the rules 445 based on device or network conditions. A validation engine 465 may be used to validate the raw data from the publisher to ensure the raw data is valid.

The distribution engine 425 may be configured to distribute messages to subscribers. The distribution engine 425 may be further configured to distribute the schema to a plurality of channel nodes in the publish-subscribe network, including to the publisher. The distribution engine 425 may also be configured to distribute the rules 445 to the plurality of channel nodes in the publish-subscribe network. The validation engine 465 may be further configured as a notification engine to notify an administrator if the raw data is invalid based on output of the validation engine 465.

The system may include a digital marketplace for receiving a subscription to the topic from the subscriber. The digital marketplace may provide an interface through which a subscriber may define rules or functions, or select from and purchase pre-defined rules or functions defined by publishers, service providers, third-parties or the like. The interface provided by the digital marketplace may also be used to create, cancel or otherwise manage subscriptions and payment information. For example, the digital marketplace may enable customers or subscribers to pay for a number of rules executed, a number of messages transmitted, or the like.

Client devices 460 may be available to access and interact with the server 400 in a computing service provider environment or one or more computing instances or clusters, over a network 455. Example client devices 460 may include, but are not limited to, a desktop computer, a laptop, a tablet, a mobile device, a television, a cell phone, a smart phone, a hand held messaging device, heads up display (HUD) glasses or any device with a display that may receive and present the message content.

The service provider environment may be implemented across one or more computing device(s) connected via a network 455. For example, a computing device may include a data store and various engines and/or modules such as those described above and such modules may be executable by a processor 405 of the computing device. The system may be implemented as a plurality of computing nodes or computing instances, each of which comprises at least one processor 405 and a memory 410, where the computing nodes are configured to collectively implement the modules, data stores and so forth.

The modules that have been described may be stored on, accessed by, accessed through, or executed by a computing device. The computing device may comprise, for example, one or more processors 405 and one or more memory modules 410. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 4 may be representative of a plurality of client devices 460 that may be coupled to the network 455. The client device(s) 460 may communicate with the computing device over any appropriate network, including an intranet, the Internet, a cellular network, a local area network (LAN), a wide area network (WAN), a wireless data network or a similar network or combination of networks. In one example, the network 455 may be the communications network of the present technology.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 5:
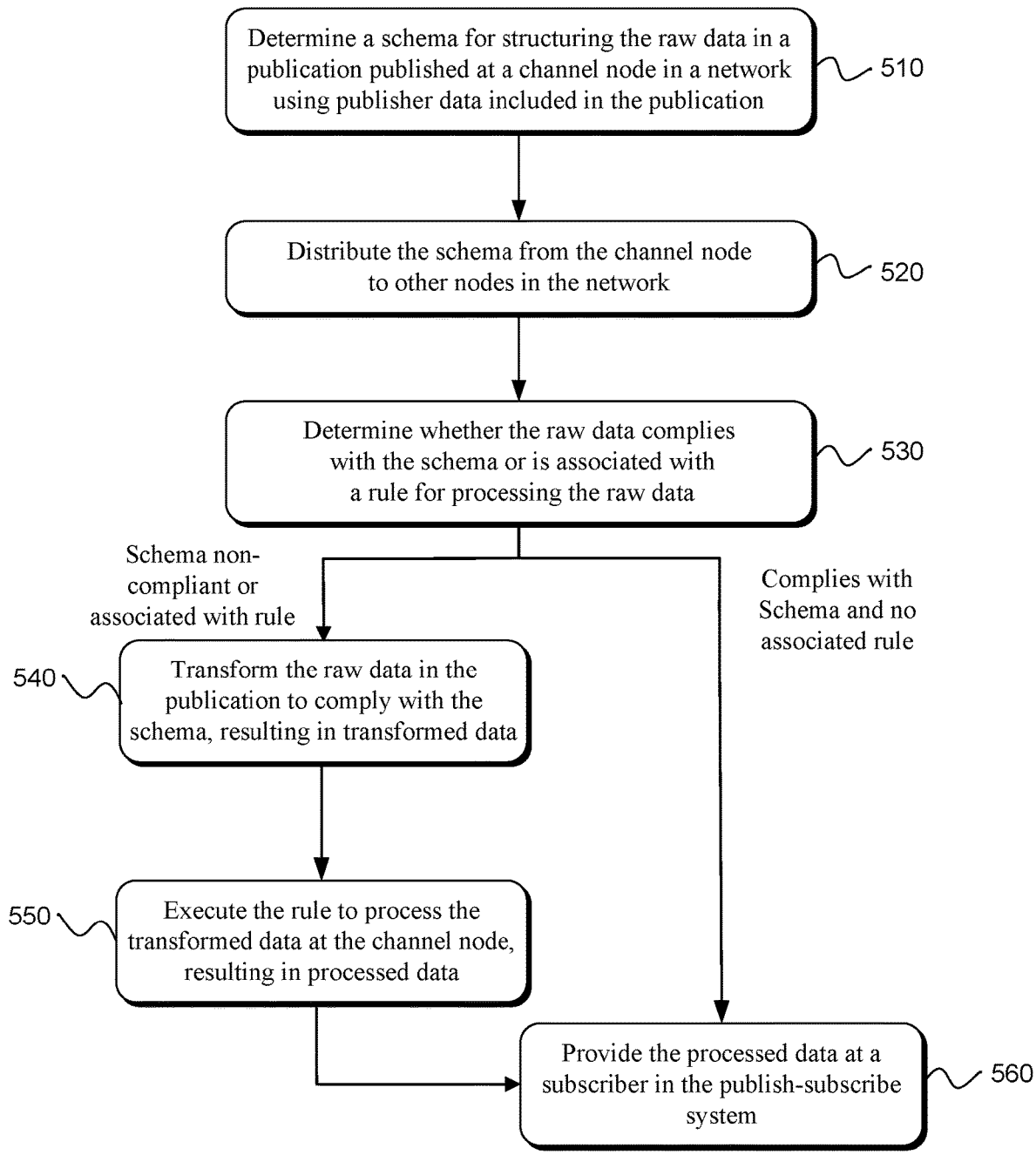
FIGS. 5-6 are flow diagrams for publish-subscribe messaging methods in accordance with examples of the present technology.
Figure 6:
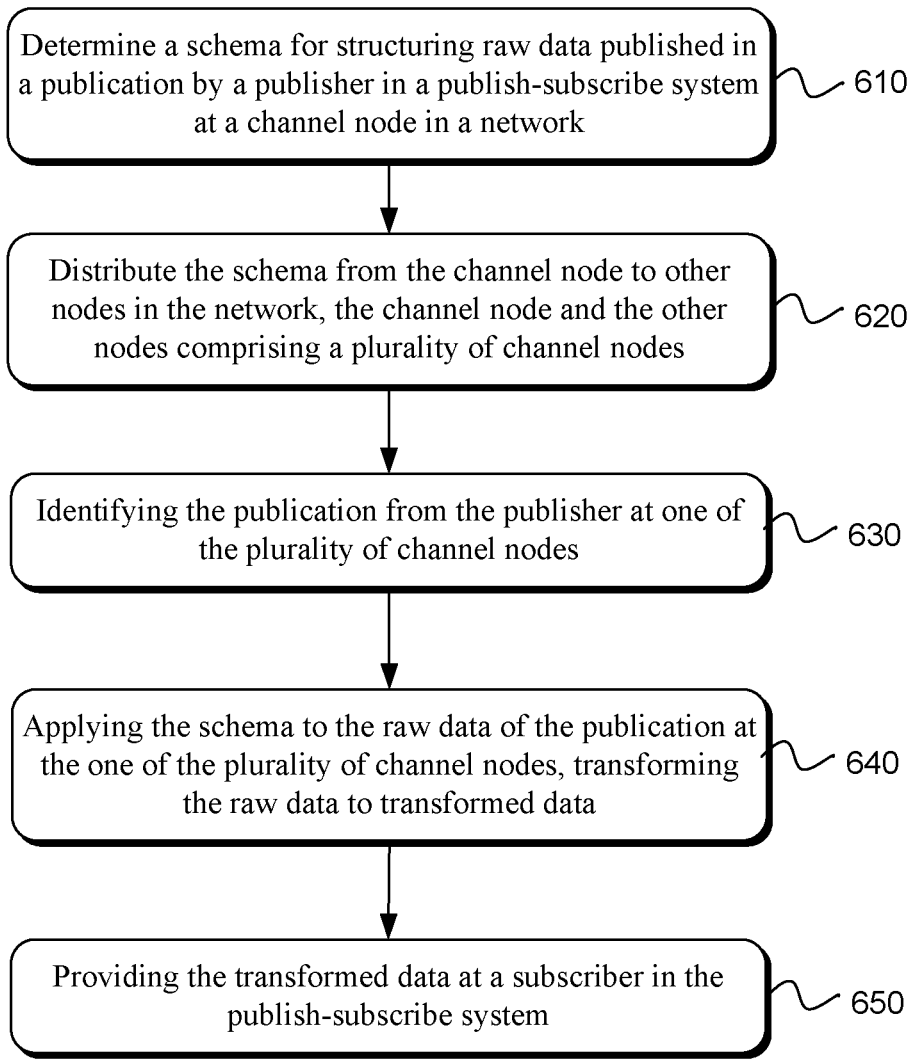

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of a method is illustrated for distributed processing of raw data in a publish-subscribe system. The method may include determining

510 a schema for structuring the raw data in a publication published by a publisher in the publish-subscribe system at a channel node in a network using publisher data included in the publication. For example, the publisher data may include information about the publisher, such as a type of the publisher device, a manufacturer of the publisher device, a model number of the publisher device, a network address of the physical device, a port number used by the publisher device to publish the publication, etc. Alternatively, or in addition, determining the schema may use the raw data to determine the schema. For example, the raw data may include tags identifying types of data included, such as temperature, speed, location, audio levels, etc. In another example, the schema may be at least partially specified by an administrator. For example, an administrator may indicate that the device is a thermometer. The method may optionally include identifying a type of thermometer from the raw data for use in interpreting the data, and may include identifying a portion of the raw data indicating the temperature. A schema may be determined for the raw data that represents the raw data in a usable manner for other devices (e.g., nodes, or channel nodes which may be publishers and/or subscribers) in a distribution channel (e.g., the publish-subscribe network) for the raw data. The method may include distributing 520 the schema from the channel node to other nodes in the network. The raw data may be streaming data and may be continually evaluated for conformance with the schema. Once a schema has been determined, the schema may optionally be presented to an administrator for approval or modification before enforcing the schema on the raw data.

The method may include receiving the publication from the publisher and transforming 540 the raw data in the publication to comply with the schema, resulting in transformed data, upon determination of whether the raw data complies with the schema at 530. The transformation of the raw data to comply with the schema may occur at any channel node in the network, such as at the publisher, at a subscriber, at a gateway, at a broker server, etc. A determination of where to apply the transformation may be made based on battery power, network bandwidth, network latency, privacy, processor availability, memory availability, etc. at any particular node where the publication is received. If, for example, the determination indicates that there will be less latency by transforming the raw data at a different channel node, then the channel node receiving the publication may forward the publication to the different channel node where the transformation may be performed.

The method may include identifying a rule to execute on the transformed data based on the schema. In other words, the method may include determining 530 whether the raw data, or the transformed data, is associated with a rule for processing the data. Similar to the schema, the rules may be distributed across channel nodes on the network, including at the channel node and the other nodes. Distribution of the rules allows for execution of the rules to optimize performance, throughput, latency, or the like. The rules may include any of a variety of different types of rules and may be defined or selected by an administrator. Using the thermometer example above, a rule may specify that if a temperature reaches a predetermined temperature to perform an action, such as to turn on/off a heater or cooler, to open/close a window or vent, to turn on/off lawn sprinklers, or any other type of action that a user may desire. As another example, a rule may specify to perform some calculation or manipulation of the data, such as to convert the temperature from the thermometer from Fahrenheit to Celsius, or to identify a color to represent the temperature based on the degree (e.g., higher temperatures more red, lower temperatures more blue), etc.

The method may include determining whether to execute the rule at the channel node or other nodes based on device or network conditions. Some example network conditions that have been described include battery power, network bandwidth, network latency, privacy, processor availability, memory availability, etc. The method may include sending the rule to the channel node or other node(s) that have been determined and executing 550 the rule to process the transformed data at the channel node or other nodes that have been determined, resulting in processed data. The processed data may be provided 560 at a subscriber in the publish-subscribe system. In some examples, providing the processed data at the subscriber may include providing the processed data to the subscriber from another device in the publish-subscribe channel where the data was processed or may include making the processed data available which was processed at the subscriber device.

The publisher and/or the subscriber may be IoT devices. For example, the publisher may be an IoT device that includes a sensor or transducer for generating data which is used as the raw data in the publication. In another example, the raw data may include data generated by a sensor. As an implementation example, the publisher may publish location data of a physical asset. Another publisher may be a weather or temperature monitoring device. An example rule may define that when a location of the physical asset changes, to perform a function or manipulation f data. For example, the function may combine the location and temperature data, optionally as a function of time before the transformed message is transmitted to a subscriber. The subscriber may be a single subscriber or may include any number of subscribers. The subscriber may be an entity responsible for tracking the physical asset and may make a record of the received messages in order to provide reports, alerts or the like based on the location and temperature data.

In one example, the message is received from the publisher at a service. The service may be a broker service for managing the publication of messages to the subscribers. The service may include a server clock. The service may update the message data to include the current time using the server clock according to applicable rules or functions.

In some examples, this or other methods described herein may be implemented wholly or partially as computer readable program code executed by a processor and the computer readable code may be embodied on a non-transitory computer usable medium.

An example practical implementation of the present technology may include a customer that provides actionable information to consumers about the consumers' cars and driving habits. The customer may collect several data points such as speed, acceleration, GPS (Global Positioning System) location, fuel level, distance travelled, engine RPM, engine oxygen flow and battery voltage. The data points may be collected from OBD2 (on-board diagnostics) devices (dongles hooked in the cars) and from mobile phones. The customer may calculate metrics such as fuel efficiency, hard braking events, and an overall 'good driver' score from the collected data in near-real-time. The metrics may be viewable by consumers on the customer's website and phone app.

The customer may use near-real-time predictive analytics for tasks such as estimating fuel efficiency based on the model and location of the car. The customer may use predictive analytics for anomaly detection and failure prediction. As an example of anomaly detection, the customer may monitor airflow sensor data and generate automated notifications for the customer and the consumers if the data does not look right, either because the data is invalid or because there is a physical issue with the car. As an example of failure prediction, the customer may want to predict when a battery will fail based on the trend in the battery voltage over a few months.

As the customer devices in the consumers' cars connect and start sending data, the present technology may automatically create device data streams that the customer's worker applications may access for calculating metrics such as fuel efficiency and hard braking. The customer may support several different types of devices for collecting data, including third-party OBD2 devices, the customer's own car dongle, and the customer's smartphone app. The type, format, frequency, and amount of data may vary from device to device. The customer may define common schemas for device-generated data to conform with. In case of third-party devices, the customer has limited control over the type/format/frequency/amount of data emitted by the devices. As such, the customer may optimize the data flow from the device to the service provider environment, etc. The present technology may be used to automatically define and assign the schemas to the customer's devices.

The customer may configure data transformation rules in the present system to convert raw data into the desired shape, format, etc. In some examples, the devices may execute the rules on the data on-board a device as well as in the service provider environment or elsewhere.

As is common among devices, the customer's devices may sample data at a much higher rate than what is usable in the foreseeable future for analysis. For example, engine RPM may be sampled at 10 Hz, while in practice samples at 1 Hz are more than sufficient. The customer may configure aggregation rules to have device data streams contain data points at the desired frequency and potentially, to smooth out noise. The customer may rely on the present technology orchestrate part of the aggregation on-board the devices to reduce network bandwidth consumption.

Customer devices may have intermittent connectivity to the service provider environment. The customer may define a rule to collect, aggregate and/or manipulate a batch series of data points and send these at once the service provider environment when the network connectivity is available. The customer may timestamp data points on the device to ensure that the lack of network connectivity does not result in inaccurate data.

A consumer may change the OBD device used in a car. A given OBD device may also be moved from one car to another. The present technology may be configured to transfer communication topics assigned to a device, registry information, device shadows and the like to another device. In other words, the data associated with the first OBD device may be optionally re-associated with the second OBD device to provide a seamless experience to the consumer.

Referring now to FIG. 6, a flow diagram is illustrated for a publish-subscribe method. In this example, the publish-subscribe method may include determining 610 a schema for structuring raw data published in a publication by a publisher in a publish-subscribe system at a channel node in a network and distributing 620 the schema from the channel node to other channel nodes in the network. The method may include identifying 630 the publication from the publisher at one of the channel nodes and applying 640 the schema to the raw data of the publication at the channel node, transforming the raw data to transformed data. The transformed data may be provided 650 at a subscriber in the publish-subscribe system.

The method may further include determining whether the publisher is producing invalid raw data by comparing the raw data in the publication to the schema or to historical data in a historical publication. Specifically, this determination may be made by comparing a number of data points in the raw data of the publication with a number of data points in the historical data of the historical publication. The raw data may be identified as invalid when the number of data points in the raw data and the number of data points in the historical data are different. For example, if a publisher is expected to include four different data points in each publication and historically has included these four different data points in the publications, then if a publication is received with two or six data points, the raw data may be identified as invalid. As another example, the periodicity of data points may be evaluated against historical data to determine invalidity. For example, if a device typically published data points every minute and subsequently starts publishing data points every second, the data points may be suspect and may be considered invalid or potentially invalid. As another example, data points may have an acceptable range of values and data points outside the acceptable range may be considered invalid. For example, if a valid temperature range is set from 0-100° Celsius and a data point identifies the temperature as 200° Celsius, the data point may be considered invalid. As another example, the domain of the data may be considered in determining invalidity. In other words, a format or type of the data or encoding of the data may be indicative of invalidity. For example, if plain text is expected as the data and instead the data includes unintelligible or unexpected data or characters, the data points may be considered invalid. An administrator may optionally be notified when invalid or suspected invalid data is identified.

In one example, the method may include instructing the publisher to follow the schema and publish the transformed data. In other words, after identifying or determining the schema at a channel node in the network, the schema may be sent back to the publisher to instruct the publisher to comply with the schema when publishing the data. Thus, the publisher may begin publishing the transformed data that already complies with the schema rather than relying on a different network node to perform the transformation.

The method may include capturing or determining schemas for raw data from a plurality of publishers. Each of these publishers may use a different format or schema for the published data but may be publishing similar or related data. The method may thus further include determining a common schema to be applied to the raw data from the plurality of publishers based on a schema that is relevant to the raw data and transforming the raw data in the schemas from the plurality of publishers to the common schema. Use of a common schema between the devices may further facilitate ease of communication or interpreting of data exchanged between the devices.

In one example of the method, determining the schema may include building a schema based at least in part on a topic structure of the raw data, a message structure of the raw data, message content, or device information for the publisher. As another example, determining the schema may include receiving at least a partial definition of the schema from an administrator.

The method may include receiving a definition of a rule to execute on the transformed data from an administrator. The rule may be distributed to the plurality of channel nodes.

The method may then include determining at which of the plurality of channel nodes to execute the rule based on at least one of battery power, network bandwidth, latency or privacy. The rule may then be executed to process the transformed data. The rule may be partially executed at one of the plurality of channel nodes and partially executed at another one of the plurality of channel nodes to complete execution of the rule. The rule may include multiple rules or may trigger one or more additional rules. In this example, the method may include executing a first rule of the plurality of rules at a first node of the plurality of channel nodes and executing a second rule of the plurality of rules at a second node of the plurality of channel nodes.

The message data, or the transformed message data, may include any of a variety of suitable data types. For example, the message data may include any one or more of text (e.g., alphanumeric characters), an image, a video, audio, time, temperature, speed, location, or any of a number of other types not listed but which would be apparent to one of skill in the art and which are considered to be within the scope of this disclosure.

In one example, the message may be published by transmitting the transformed message to the subscriber via a transmission control protocol (TCP). However, other types of transmission protocols which are not listed here are also contemplated.

Figure 7:
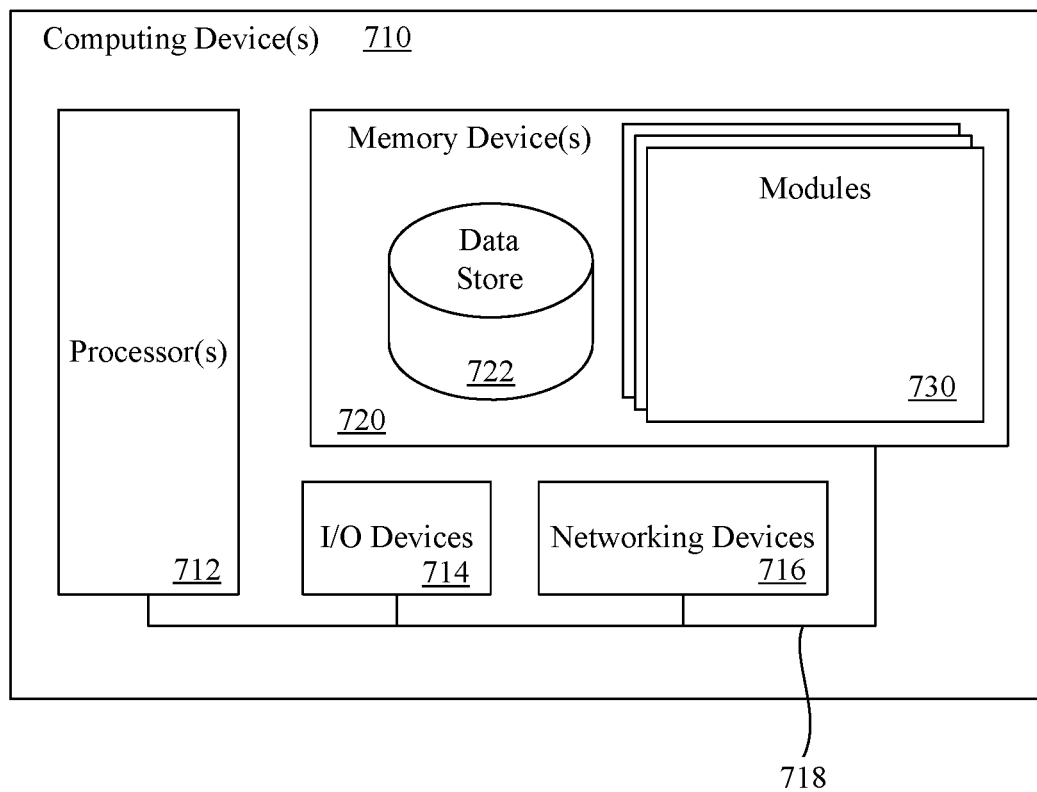
FIG. 7 is a block diagram of a computing system for use in managing publish-subscribe messaging in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A computer-implemented method for distributed processing of raw data in a publish-subscribe system, comprising:
   determining, by a broker node managing publish-subscribe messaging of nodes in the publish-subscribe system, a schema defining a structure to be applied to the raw data in a publication message published by a publisher device in the publish-subscribe system, using publisher data included in the publication message;
   distributing, using a publish-subscribe channel that includes other nodes in the publish-subscribe system, the schema defining the structure to be applied to the raw data from the broker node to the other nodes to enforce the schema across the publish-subscribe channel;
   receiving the publication message from the publisher device;
   transforming the raw data in the publication message to comply with the schema defining the structure to be applied to the raw data, resulting in transformed data;
   identifying a rule to execute on the transformed data based on the schema, the rule being distributable across the other nodes;

determining whether to execute the rule at one of the other nodes based in part on one or more device conditions or network conditions being monitored for the other nodes; and sending the rule from the broker node to the determined one of the other nodes to process the transformed data using the rule, resulting in processed data at a subscriber in the publish-subscribe system.

2. The method of claim 1, wherein the raw data from the publisher device is streaming data.

3. The method of claim 1, wherein the schema comprises a plurality of schemas and the publisher device is a single publisher device, the method further comprising applying the plurality of schemas to the raw data.

4. The method of claim 1, further comprising monitoring the other nodes for the one or more device conditions or network conditions, wherein the one or more device conditions or network conditions include at least one of battery power, network bandwidth, network latency, privacy, processor availability, processor speed, or memory availability.

5. The method of claim 1, wherein determining the schema comprises automatically detecting a device schema used by the publisher device and providing the device schema to an administrator for approval or modification.

6. A computer-implemented method, comprising:
determining, at a channel node in a network, a schema defining a structure to be applied to raw data published in a publication message by a publisher device in a publish-subscribe system that includes the channel node, using data of the publication message;
distributing, using a publish-subscribe channel that includes other nodes in the network, the schema defining the structure to be applied to the raw data from the channel node to the other nodes in the network to enforce the schema across the network;
identifying the publication message from the publisher device at the channel node;
determining, based in part on one or more device conditions or network conditions at the other nodes in the network, whether to apply the schema to the raw data of the publication message, at the channel node, in order to transform the raw data to transformed data;
determining, based in part on the one or more device conditions or network conditions at the other nodes, whether to execute a rule at the channel node on the transformed data to process the transformed data using the rule, resulting in processed data; and
providing the processed data to a subscriber in the publish-subscribe system using the channel node.

7. The method of claim 6, further comprising determining whether the publisher device is producing invalid raw data by comparing the raw data in the publication message to the schema or to historical data in a historical publication message.

8. The method of claim 7, wherein determining whether the publisher device is producing invalid raw data by comparing the raw data to the historical data comprises comparing a number of data points in the raw data of the publication message with a number of data points in the historical data of the historical publication message, and identifying the raw data as invalid when the number of data points in the raw data of the publication message and the number of data points in the historical data are different.

9. The method of claim 6, further comprising instructing the publisher device to follow the schema and publish the transformed data.

10. The method of claim 6, further comprising:
determining schemas for raw data from a plurality of publisher devices,
determining a common schema to be applied to the raw data from the plurality of publisher devices; and
transforming the raw data from the plurality of publisher devices to the common schema.

11. The method of claim 6, wherein determining the schema comprises building a schema based at least in part on a topic structure of the raw data, a message structure of the raw data, message content, or device information for the publisher device.

12. The method of claim 6, wherein determining the schema comprises receiving definition of the schema from an administrator.

13. The method of claim 6, further comprising:
receiving a definition of the rule to execute on the transformed data from an administrator; and
distributing the rule to one of a plurality of channel nodes in the network.

14. The method of claim 13, further comprising:
determining one of the plurality of channel nodes at which to execute the rule based on at least one of battery power, network bandwidth, processor speed, or network latency; and
sending the rule from the channel node to the determined one of the plurality of channel nodes, to process the transformed data.

15. The method of claim 13, further comprising sending the rule from the channel node to one of the plurality of channel nodes to partially execute the rule and sending the rule from the channel node to another one of the plurality of channel nodes to completing execution of the rule.

16. The method of claim 13, wherein the rule comprises a plurality of rules, the method further comprising executing a first rule of the plurality of rules at a first node of the plurality of channel nodes and executing a second rule of the plurality of rules at a second node of the plurality of channel nodes.

17. A non-transitory computer-readable medium comprising computer-executable instructions which implement a publish-subscribe network, comprising:
a schema detector configured for detecting a schema defining a structure to be applied to raw data in a publication message published by a publisher device in the publish-subscribe network that includes a plurality of channel nodes, using publisher data included in the publication message at one channel node in the plurality of channel nodes;
a network distribution engine configured for distributing, using a publish-subscribe channel that includes the plurality of nodes, the schema defining the structure to be applied to the raw data from the one channel node to another channel node in the plurality of channel nodes in the publish-subscribe network, including to the publisher device, to enforce the schema across the publish-subscribe network;
a schema engine for applying the schema to the raw data to transform the raw data to transformed data; and
a rules engine for executing a rule on the transformed data for processing the data into processed data;
wherein the network distribution engine monitors the plurality of channel nodes to distribute, based in part on one or more device conditions or network conditions monitored for the plurality of nodes, the rule from the one channel node to the other channel node in the publish-subscribe network to optimize performance of the plurality of channel nodes.

18. The non-transitory computer readable medium of claim 17, wherein the rules engine is configured to determine at which of the plurality of channel nodes to execute the rule based on the one or more device conditions or network conditions monitored for the plurality of channel nodes.

19. The non-transitory computer readable medium of claim 17, further comprising a validation engine to validate the raw data from the publisher device to ensure the raw data is valid, and wherein the network distribution engine is further configured to notify an administrator if the raw data is invalid.

20. The non-transitory computer readable medium of claim 17, wherein the publisher device is an internet of things (IoT) device having a transducer for detecting a condition and expressing the condition as the raw data.

* * * * *